United States Patent
Peterson et al.

(10) Patent No.: US 6,853,907 B2
(45) Date of Patent: Feb. 8, 2005

(54) METHOD AND SYSTEM FOR COMMUNICATING VEHICLE LOCATION INFORMATION

(75) Inventors: Michael J. Peterson, Farmington Hills, MI (US); Wylie R. Burt, Ypsilanti, MI (US)

(73) Assignee: General Motors Corporation, Detroit, MI (US)

(*) Notice: Subject to any disclaimer, the term of this patent is extended or adjusted under 35 U.S.C. 154(b) by 100 days.

(21) Appl. No.: 10/103,023

(22) Filed: Mar. 21, 2002

(65) Prior Publication Data

US 2003/0182054 A1 Sep. 25, 2003

(51) Int. Cl.[7] .............................................. G01C 21/00
(52) U.S. Cl. ........................ 701/207; 701/208; 701/214; 340/995.12; 340/995.25; 455/456.1
(58) Field of Search ................................. 701/207, 208, 701/209, 213, 214; 340/992.12, 995.16, 995.19, 995.23, 995.24, 995.25, 995.27, 995.28; 455/426, 522, 456.1, 456.2, 456.3; 704/246, 275, 247, 251, 277

(56) References Cited

U.S. PATENT DOCUMENTS

| | | | | |
|---|---|---|---|---|
| 5,223,844 A | * | 6/1993 | Mansell et al. | 342/357.07 |
| 5,334,974 A | * | 8/1994 | Simms et al. | 340/990 |
| 5,712,899 A | * | 1/1998 | Pace, II | 455/456.2 |
| 5,898,392 A | * | 4/1999 | Bambini et al. | 340/996 |
| 5,959,577 A | * | 9/1999 | Fan et al. | 342/357.13 |
| 6,028,537 A | * | 2/2000 | Suman et al. | 340/988 |
| 6,167,255 A | * | 12/2000 | Kennedy et al. | 455/414.1 |
| 6,278,941 B1 | * | 8/2001 | Yokoyama | 701/209 |
| 6,505,161 B1 | * | 1/2003 | Brems | 704/270 |
| 6,522,265 B1 | * | 2/2003 | Hillman et al. | 340/988 |
| 6,529,143 B2 | * | 3/2003 | Mikkola et al. | 340/995.1 |
| 6,535,743 B1 | * | 3/2003 | Kennedy et al. | 455/456.1 |
| 6,564,143 B1 | * | 5/2003 | Alewine et al. | 701/207 |
| 6,691,026 B2 | * | 2/2004 | Odinak et al. | 701/202 |
| 2003/0008661 A1 | * | 1/2003 | Joyce et al. | 455/456 |

* cited by examiner

Primary Examiner—Tan Q. Nguyen
(74) Attorney, Agent, or Firm—Anthony Luke Simon

(57) ABSTRACT

The invention provides a method for communicating a vehicle location information by initiating communication between a mobile communication unit and a receiving center, requesting a location information wherein the request is initiated by an automated speech recognition unit, receiving the request for vehicle information at the receiving center, receiving a vehicle location signal at the receiving center from the mobile vehicle, retrieving geographic information from a database based on the vehicle location signal, and sending the geographic information to the mobile vehicle.

4 Claims, 4 Drawing Sheets

METHOD AND SYSTEM FOR COMMUNICATING VEHICLE LOCATION INFORMATION

FIELD OF THE INVENTION

In general, the invention relates to data transmission over a wireless communication system. More specifically, the invention relates to a method and system for communicating a mobile vehicle location and associated information.

BACKGROUND OF THE INVENTION

Mobile communication units (MCU's), such as cellular phones, personal data assistants (PDA's), Global Positioning System (GPS) devices, and on-board Vehicle Communication Units (VCU's), used in conjunction with a Wide Area Network (WAN), such as a cellular telephone network or a satellite communication system, have made it possible for a person to send and receive voice communications, data transmissions, and FAX messages from virtually anywhere on earth. Such communication is initiated at the MCU when it is turned on, or by entering a phone number to be called, or in many cases, by pressing a preprogrammed button on the MCU or speaking a voice command causing the MCU to automatically complete the process of dialing the number to be called. A radio communication link is established between the MCU and a Wide Area Network (WAN), using a node of the WAN in the vicinity of the MCU.

In cellular telephone systems, a node is commonly referred to as a "cellular receiving center." Once the radio communication link between the MCU and the cellular receiving center has been established, the receiving center then utilizes a combination of additional cellular stations, conventional telephone wire line networks, and possibly even satellite systems to connect the MCU to the number to be called.

For an MCU operating in a single country of origin, existing communication systems are highly automated and capable of making the complex connections between the MCU and the number to be called in a manner that is, in most cases, virtually imperceptible to the person initiating communication from the MCU. Indeed, MCU users expect and demand that they be able to place a call with little or no effort on their part, beyond dialing a phone number, or pressing a speed dial button.

Wireless communication services for MCU users, such as navigation and roadside assistance, have increased rapidly in recent years. Most of the services that have been offered are for a motor vehicle in operation, and include services that may require location and destination information.

An Automated Speech Recognition (ASR) platform as is known in the art, may be designed to respond to a MCU users transmitted speech signal (e.g., voice commands) from the mobile vehicles with an audio signal that corresponds to the context of the transmitted speech signal. This may provide the wireless communication services to be accessed via the ASR; however, a customer assistant representative is still required for many of the services.

A current method of wireless communication services for MCU users as are known in the art may allow for an MCU users request for the mobile vehicle's present location information to be provided manually or in conjunction with the ASR. As mentioned, the current method typically provides such information through an operator or customer assistant from a wireless communication services customer assistance center (or other such manually staffed service center). As many as 25,000 calls a day may be made to wireless communication service customer assistance centers requesting an MCU users mobile vehicle's present location information. The cost for the assistance center to answer this request alone is very high, with a very small return on investment. Also, the current methods for providing the mobile vehicle's present location information may supply little if any additional geographic information.

Thus, there is a significant need for a method and system for improving the communication of a vehicle's location information that overcomes the above disadvantages and shortcomings, as well as other disadvantages.

SUMMARY OF THE INVENTION

One aspect of the invention provides a method for communicating a vehicle location information, that can initiate communication between a mobile communication unit and a receiving center, request a location information wherein the request is initiated by an automated speech recognition unit, and receive the request for vehicle information at the receiving center. Also, the method provides for receiving a vehicle location signal at the receiving center from the mobile vehicle, retrieving geographic information from a database based on the vehicle location signal, and sending the geographic information to the mobile vehicle.

Another aspect of the invention provides a system for communicating a vehicle location information, comprising means for initiating communication between a mobile communication unit and a receiving center, requesting a location information wherein the request is initiated by an automated speech recognition unit, and receiving the request for vehicle information at the receiving center. Also, the system provides for receiving a vehicle location signal at the receiving center from the mobile vehicle, retrieving geographic information from a database based on the vehicle location signal, and sending the geographic information to the mobile vehicle.

Another aspect of the invention provides a computer readable medium storing a computer program comprised of computer readable code for initiating communication between a mobile communication unit and a receiving center, requesting a location information wherein the request is initiated by an automated speech recognition unit, and receiving the request for vehicle information at the receiving center. Also, the computer readable code provides for receiving a vehicle location signal at the receiving center from the mobile vehicle, retrieving geographic information from a database based on the vehicle location signal, and sending the geographic information to the mobile vehicle.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF A PREFERRED EMBODIMENT

Figure 1:
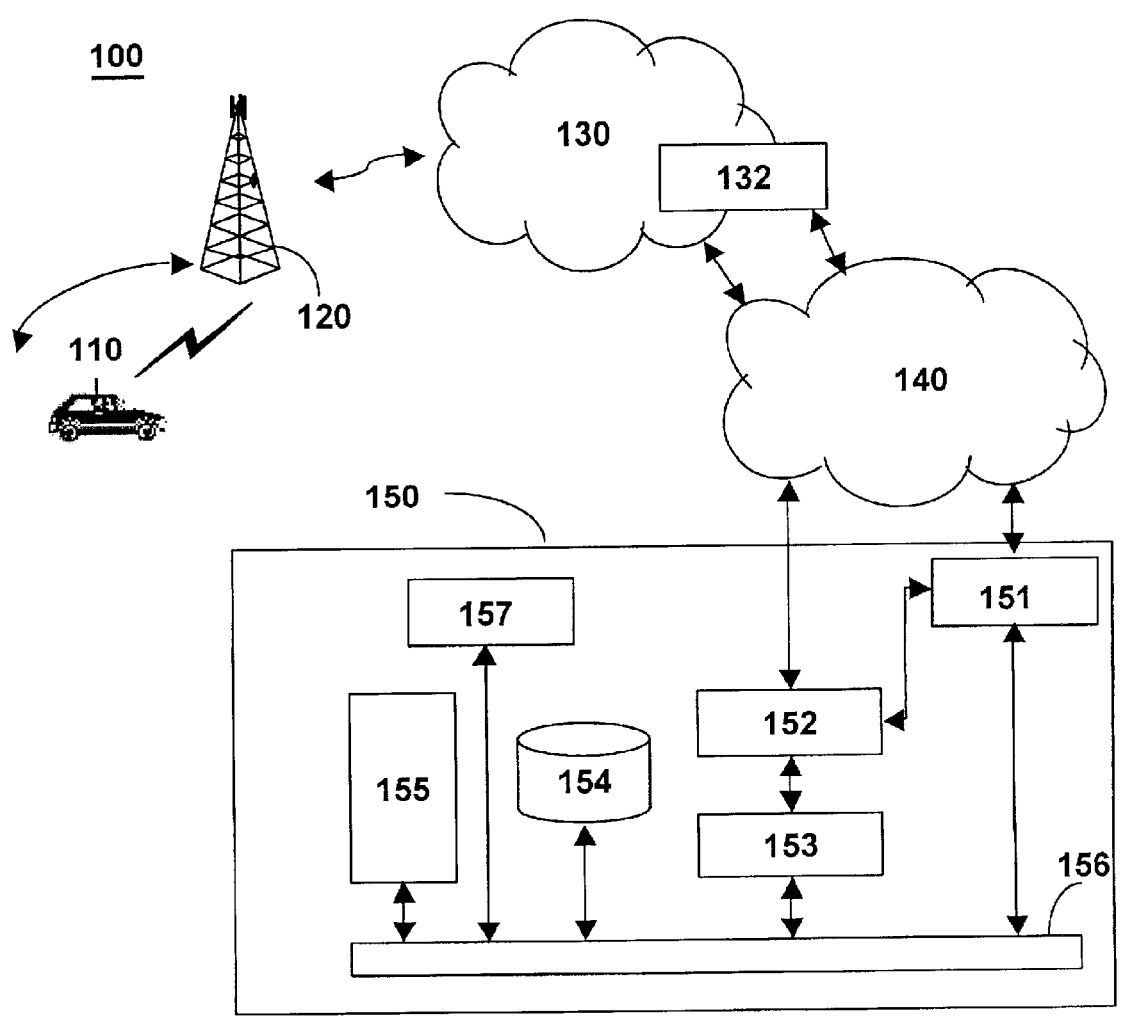
FIG. 1 is a schematic diagram for one embodiment of a system for accessing a mobile vehicle using a wireless communication system, in accordance with the current invention.

FIG. 1 shows an illustration of one embodiment of a system for communicating with a mobile vehicle using a wireless communication system in accordance with the present invention, and may be referred to as a mobile vehicle communication system (MVCS) 100, and in one embodiment may include the OnStar System as is known in the art. The mobile vehicle communication system 100 may contain one or more mobile vehicles (mobile vehicle communication unit) 110, one or more wireless carrier systems 120, one or more communication networks 130, one or more short message service centers 132, one or more land networks 140, and one or more call centers 150. Call center 150 may contain one or more switches 151, one or more data transmission devices 152, one or more communication services managers 153, one or more communication services databases 154, one or more advisors 155, one or more bus systems 156, and one or more automated speech recognition (ASR) units 157.

Mobile vehicle 110 may contain a wireless vehicle communication device (module, MVCS module) such as an analog or digital phone with suitable hardware and software for transmitting and receiving data communications. Mobile vehicle 110 may contain a wireless modem for transmitting and receiving data. Mobile vehicle 110 may contain a digital signal processor with software and additional hardware to enable communications with the mobile vehicle attributes, and to perform other routines and requested services. Mobile vehicle 110 may contain a global positioning system (GPS) unit capable of determining synchronized time and a geophysical location of the mobile vehicle. Mobile vehicle 110 may send to and receive radio transmissions from wireless carrier system 120. Mobile vehicle 110 may contain a speech recognition system (ASR) capable of communicating with the wireless vehicle communication device. The module may additionally be capable of functioning as any part or all of the above communication devices and, for one embodiment of the invention, may be capable of data storage, and/or data retrieval, and/or receiving, processing, and transmitting data queries.

Wireless carrier system 120 may be a wireless communications carrier or a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 120 may transmit to and receive signals from mobile vehicle 110. Wireless carrier system 120 may transmit to and receive signals from a second mobile vehicle 110. Wireless carrier system 120 may be connected with communications network 130.

Communications network 130 may comprise a mobile switching center. Communications network 130 may comprise services from one or more wireless communications companies. Communications network 130 may be any suitable system or collection of systems for connecting wireless carrier system 120 to at least one mobile vehicle 110 or to a call center.

Communications network 130 may include one or more short message service centers 132. Short message service center 132 may prescribe alphanumeric short messages to and from mobile vehicles 110. Short message service center 132 may include message entry features, administrative controls, and message transmission capabilities. For one embodiment of the invention, the short message service center 132 may include one or more automated speech recognition (ASR) units. Short message service center 132 may store and buffer the messages. Short message services may include functional services such as paging, text messaging and message waiting notification. Short message services may include other telematic services such as broadcast services, time-driven message delivery, autonomous message delivery, and database-driven information services. The telematic services may further include message management features, such as message priority levels, service categories, expiration dates, cancellations, and status checks.

Land network 140 may be a public-switched telephone network. Land network 140 may be comprised of a wired network, an optical network, a fiber network, another wireless network, or any combination thereof. Land network 140 may comprise an Internet protocol (IP) network. Land network 140 may connect communications network 130 to a call center. In one embodiment of the invention, a communication system may reference all or part of the wireless carrier system 120, communications network 130, land network 140, and short message service center 132. Land network 140 may connect a first wireless carrier system 120 with a second wireless carrier system 120. Communication network 130 and land network 140 may connect wireless carrier system 120 to a communication node or call center 150.

Call center 150 may be a location where many calls can be received and serviced at the same time, or where many calls may be sent at the same time. The call center may be a telematic call center, prescribing communications to and from mobile vehicles 110. The call center may be a voice call center, providing verbal communications between an advisor in the call center and a subscriber in a mobile vehicle. The call center may be a voice activated call center, providing verbal communications between an ASR unit and a subscriber in a mobile vehicle. The call center may contain any of the previously described functions.

The call center may contain switch 151. Switch 151 may be connected to land network 140, and may receive a modem signal from an analog modem or from a digital modem. Switch 151 may transmit voice or data transmission from the communication node. Switch 151 may also receive voice or data transmissions from mobile vehicle 110 through wireless carrier system 120, communications network 130, and land network 140. Switch 151 may receive from or send data transmissions to data transmission device 152. Switch 151 may receive from or send voice transmissions to advisor 155 via bus system 156. Switch 151 may receive from or send voice transmissions to one or more automated speech recognition (ASR) units 157 via bus system 156.

Data transmission device 152 may send or receive data from switch 151. Data transmission device 152 may be an IP router or a modem. Data transmission device 152 may transfer data to or from advisor 155, one or more communication services managers 153, one or more communication services databases 154, one or more automated speech recognition (ASR) units 157, and any other device connected to bus system 156. Data transmission device 152 may convey information received from short message service center 132 in communication network 130 to communication services manager 153.

Communication services manager 153 may be connected to switch 151, data transmission device 152, and advisor 155 through bus system 156. The call center may contain any combination of hardware or software facilitating data transmissions between call center 150 and mobile vehicle 110.

Communication services manager 153 may receive information from mobile vehicle 110 through wireless carrier system 120, short message service center 132 in communication network 130, land network 140, and data transmission device 152. Communication services manager 153 may send information to mobile vehicle 110 through data transmission device 152, land network 140, communication network 130 and wireless carrier system 120. Communication services manager 153 may send short message service messages via short message service center 132 to the mobile vehicle. Communication services manager 153 may receive short message service replies from mobile vehicle 110 via short message service center 132. Communication services manager 153 may send a short message service request to mobile vehicle 110. Communication services manager 153 may receive from or send voice transmissions to one or more automated speech recognition (ASR) units 157.

In another embodiment of the invention, short message service (SMS) communications may be sent and received according to established protocols such as IS-637 standards for SMS, IS-136 air interface standards for SMS, and GSM 03.40 and 09.02 standards. These protocols allow for example, short messages comprised of up to 160 alphanumeric characters and may contain no images or graphics. Similar to paging, an SMS communication may be posted along with an intended recipient, such as a communication device in mobile vehicle 110. The SMS communication may be sent by a communication services manager in a call center, transferred to a short message service center (SMSC), and conveyed to the intended recipient. In one embodiment of the invention, mobile vehicle 110 may receive an SMS message when the ignition is on, or when put into an SMS-ready or service-ready mode while the ignition is off. The mobile vehicle 110 may be placed in a powered down or quiescent mode while the ignition is off. When the mobile vehicle is placed into a service ready mode, the phone in the mobile vehicle may register with a local wireless carrier if needed, or with the subscriber's home system if the mobile vehicle is not roaming. If an SMS message is waiting to be sent, the wireless carrier may deliver the message and the mobile phone may acknowledge receipt of the message by an acknowledgment to the SMSC. Mobile vehicle 110 may perform an operation in response to the SMS message, and may send an SMS reply message back to the call center. Similarly, another embodiment of the mobile vehicle 110 may originate an SMS message to the call center through the SMSC.

In one embodiment of the invention, the communication services manager 153 may determine whether an SMS communication should be sent to mobile vehicle 110. An SMS message may be initiated in response to a subscriber request, such as a request to unlock the vehicle doors. An SMS message may be sent automatically, for example, when an update or vehicle preset value is desired or when a diagnostic message is needed. In another embodiment of the invention, a SMS message may be sent to periodically check the location and status of mobile vehicle 110, and for another embodiment of the invention, to request data collection, data retrieval, and/or data submission from mobile vehicle 110. Communication services manager 153 may also provide further requests and determinations based on a reply from mobile vehicle 110. Communication services manager 153 may provide information to mobile vehicle 110 from communication services database 154.

Communication services database 154 may contain records on one or more mobile vehicles 110. A portion of communication services database 154 may be dedicated to short message services. Records in communication services database 154 may include vehicle identification, location information, diagnostic information, status information, recent action information, and vehicle passenger (user) and operator (user) defined preset conditions regarding mobile vehicle 110. Communication services database 154 may provide information and other support to communication services manager 153 and automated speech recognition (ASR) units 157, and in one embodiment of the invention to external services. External services can be for example, vehicle repair services, rental agencies, marketing firms and manufacturers. Another embodiment of the invention may require external services to be authorized, such as having a multi-use license, or pre-approved such as for a one-time use.

Another embodiment of the invention may provide that communication services database 154 include geographic and/or mapping information that may include geographic features such as lakes, mountains, businesses, cities, malls, and any other feature that may be identifiable with a given location. The communication services database 154 may also include points of interest that can be spatially enabled, such as golf courses, rest areas, and historical markers.

Advisor 155 may be a real advisor or a virtual advisor. A real advisor may be a human being in verbal communication with mobile communication device 110. A virtual advisor may be a synthesized voice interface responding to requests from mobile communication device 110. Advisor 155 may provide services to mobile communication device 110. Advisor 155 may communicate with communication services manager 153, automated speech recognition (ASR) units 157, or any other device connected to bus system 156. Another embodiment of the invention may allow for the advisor 155 and ASR units 157 to be integrated as a single unit capable of any features described for either.

Figure 2:
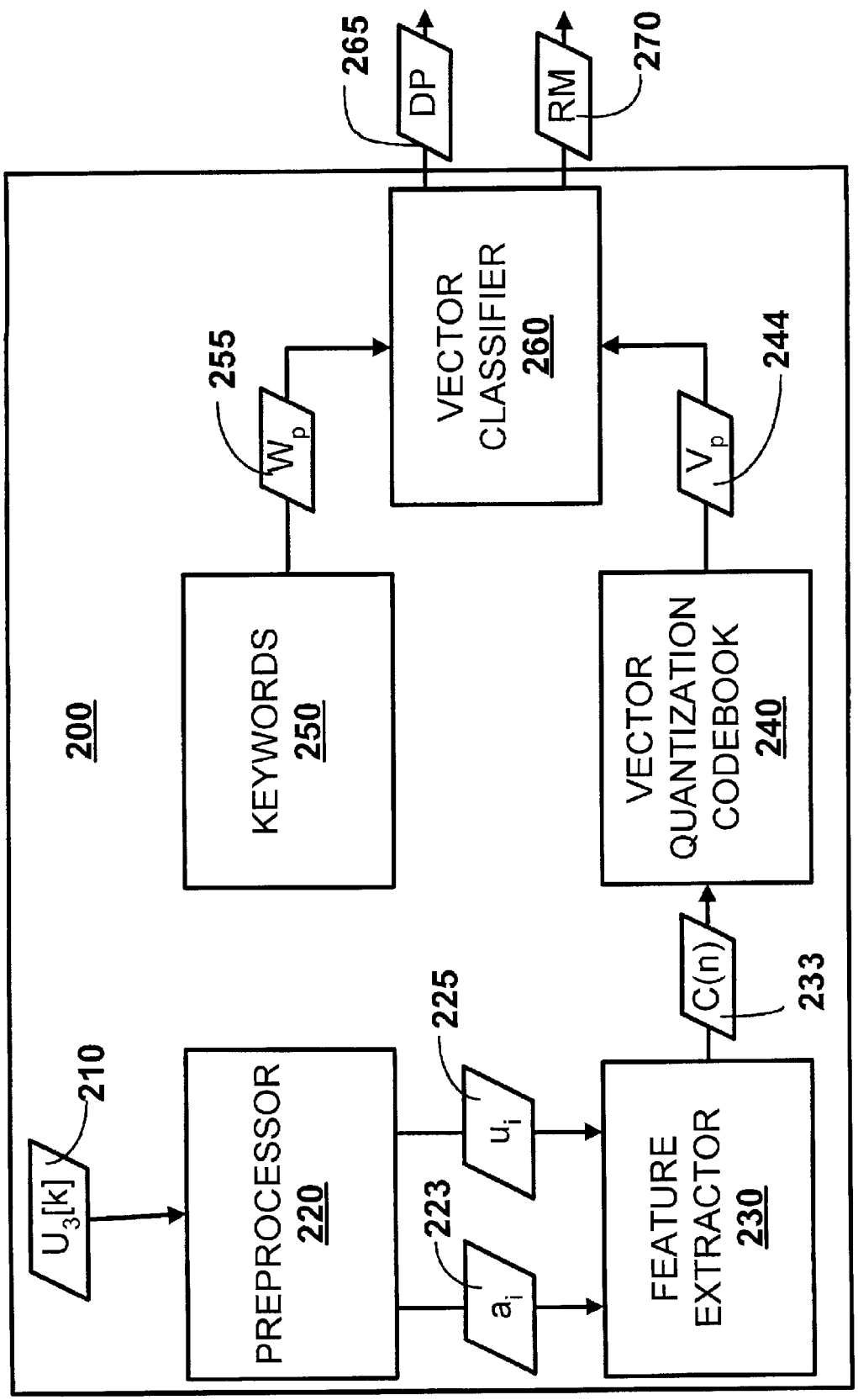
FIG. 2 is a schematic diagram for one embodiment of a voice recognition system compatible with the system of FIG. 1, in accordance with the present invention.

FIG. 2 illustrates one embodiment of an ASR unit 200 for ascertaining the acceptability of a spectral vector $V_p$. A preprocessor 220 may receive a speech signal $U_3[k]$ 210 and in response, provide a set of pole-zero coefficients $a_i$ 223 and $U_i$ 225. The preprocessor 220 may use the assumption that the speech signal $U_3[k]$ 210 is a linear combination of L previous samples. In one embodiment of the invention, the $a_i$ 223 coefficients may be the resulting predictor coefficients, which may be chosen to minimize a mean square filter prediction error signal e[k] summed over an analysis window. Another embodiment of the invention may provide the preprocessor 220 to transform the speech signal $U_3[k]$ 210 into a representation of a corresponding spectral signal $U_3(z)$.

A feature extractor 230 may receive pole-zero coefficients $a_i$ 223 and $u_i$ 225, and in response thereto, provide a set of cepstral coefficients C(n) 233 representative of a spectral parameters corresponding to speech signal $U_3[k]$ 210.

A vector codebook 240 may receive cepstral coefficients C(n) 233 and conventionally provide spectral vector $V_p$.

244. In one embodiment of the invention, vector codebook 240 may conventionally transform the cepstral coefficients C(n) 233 to the spectral vector $V_p$ 244.

A vector classifier 260 may receive the spectral vector Vp 244 as well as keyword $W_p$ 255 from a keywords module 250. It may be assumed that the dimension of the spectral vector $V_p$ 244 and keyword $W_p$ 255 is m. Another embodiment of the invention may respond that the vector classifier 260 provide either the data packet DP 265 or the rejection message RM 270. Additionally, the keywords module 250 can be designed to produce voice recognition topics, which may be a group of words, pronunciations, and corresponding word usage statistics (language modeling), created for a specific subject, such as interstate travel, and vehicle user preferences (presets).

ASR unit 200 may consist of digital and/or analog hardware, software, or a combination of hardware and software. In alternative embodiments, ASR unit 200 may be incorporated within a wireless network, a wireline network, a filtering system, or distributed among a transceiver, a wireless network, a wireline network and/or a filtering system.

Figure 3:
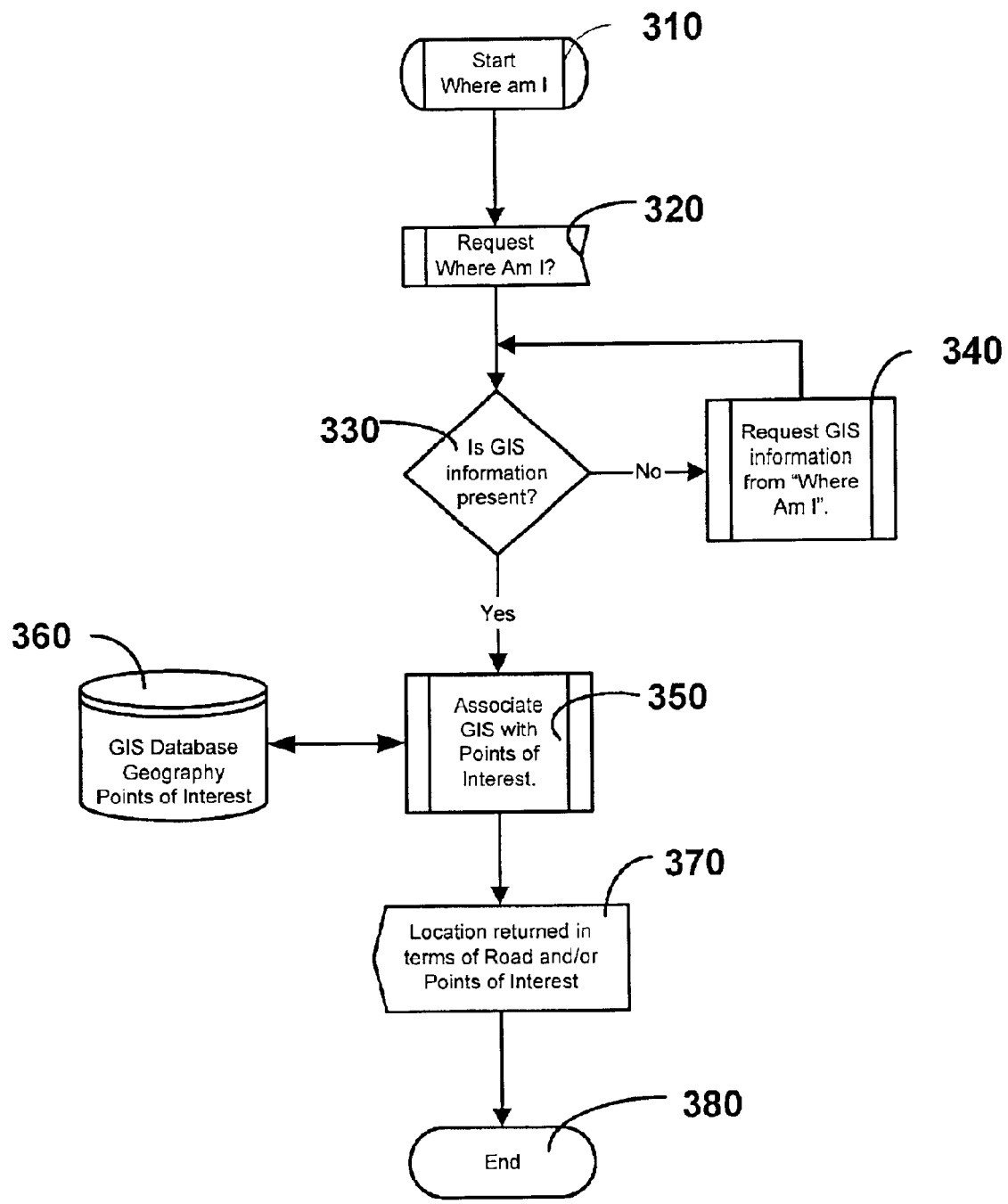
FIG. 3 is a flow chart representation for one embodiment of a vehicle location communication utilizing the systems of FIG. 1 and FIG. 2, in accordance with the present invention.

One embodiment of the invention is further illustrated in FIG. 3 as a method for location communication (vehicle location communication) of the mobile vehicle 110. This embodiment may be described as a function "where am I" (geographic information function) 310 and may be started (activated) by a verbal request, by activating a device, by a software program, etc. The function may provide an analog or digital request of "Where am I" 320 from the mobile vehicle, to a receiving center (short message service center, call center, or an external ASR unit). After receiving the transmission, the receiving center may determine if GPS data (current location information) is present in the transmission 330. If not, a request for GPS data may be requested of the mobile vehicle 340. Once GPS data has been received, the receiving center or device may associate the GPS data 350 with a GIS database 360 containing specific geographic data, such as roads, cities, states, etc., and an associated database (POI Database) 370 containing points of interest, to determine an address on a road and nearby points of interest. With the mobile vehicles GPS data and the associated geographic information relative to it now known, the receiving center may transmit the associated geographic and descriptive location information via an automated voice service utilizing speech technologies and platforms known in the art, back to the mobile vehicle 380. This embodiment of a vehicle location communication may end 390 with the associated geographic information being provided in a predetermined format of complexity, for example:

You are on Main Street.
You are on Main Street near 1$^{st}$ Street.
You are on Main Street between 1$^{st}$ Street and 2$^{nd}$ Street.
You are on Main Street heading north.
You are at 104 Main Street.
You are on Main Street heading towards City Lake or the Civic Center.

Figure 4:
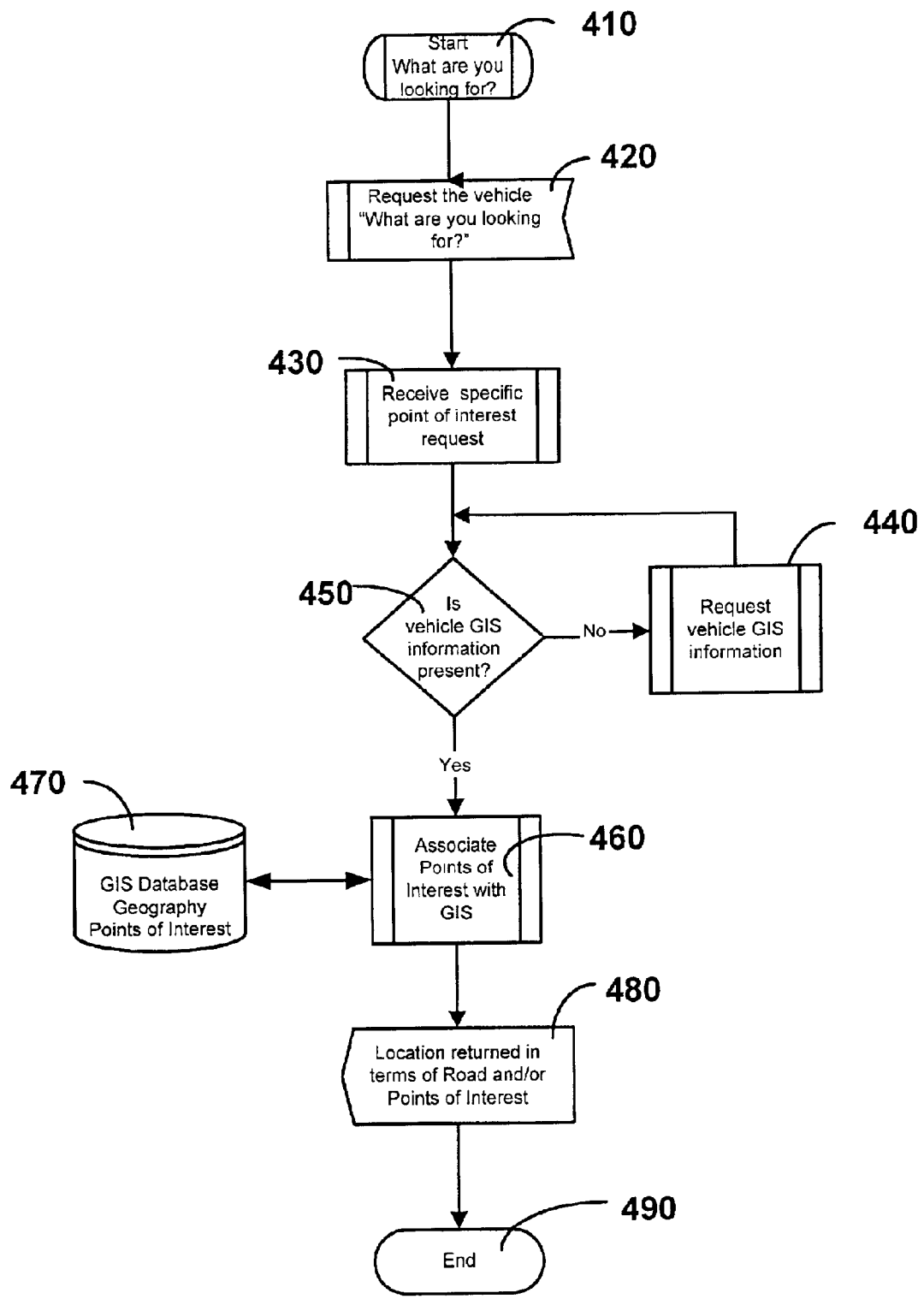
FIG. 4 is a flow chart representation for another embodiment of a vehicle location communication utilizing the systems of FIG. 1 and FIG. 2, in accordance with the present invention.

FIG. 4 is a flow chart representation for another embodiment of a vehicle location communication method wherein the receiving center may provide the function "what are you looking for" (geographic information function) 410 and may be started by a verbal request, an activated device, a software program, etc. The function may provide the automated analog or digital request of "What are you looking for" 420 to a mobile vehicle. The mobile vehicle may provide a point of interest reply to an ASR unit associated with the function 430. After receiving the point of interest reply, the receiving center may determine if GPS data for the mobile vehicle is present in the transmission 450. If not, a request for GPS data may be requested of the mobile vehicle 440. With GPS data provided, the receiving center or device may associate the GPS data and requested point of interest with known points of interest and navigational information 460, which may be provided by a GIS database 470, and a POI database 475. The GIS and POI databases contain points of interest as related to the GPS data and requested point of interest, as well as the navigation information on how to get to the requested points of interest. With the mobile vehicles GPS data, the requested point of interest and the associated geographic information relative to it now known, the method of FIG. 4 may transmit the navigation information via an automated voice service utilizing speech technologies and platforms known in the art, back to the mobile vehicle 480. This embodiment of a vehicle location communication may end 490 with the associated geographic and descriptive location information being provided in a predetermined format of complexity, for example:

The golf course is north another mile
The next rest area is 10 miles away
Turn right at the next corner and you will see it on the left The above-described methods and implementation for communicating a mobile vehicle location and associated information are example methods and implementations. These methods and implementations illustrate one possible approach for communicating a mobile vehicle location and associated information. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

We claim:

1. A method for communicating a vehicle location information, comprising:
    initiating communication between a mobile communication unit and a receiving center;
    requesting a location information, wherein the request is initiated by an automated speech recognition unit;
    receiving the request for vehicle information at the receiving center;
    receiving a vehicle location signal at the receiving center from the mobile vehicle;
    retrieving geographic information from a database based on the vehicle location signal; and sending the geographic information to the mobile vehicle and wherein initiating the request for location information comprises:
    providing a set of pole-zero coefficients in response to a speech signal;
    providing a set of cepstral coefficients in response to the pole-zero coefficients;
    providing a spectral vector in response to the cepstral coefficients; and
    classifying the spectral vector and a keyword.

2. The method of claim 1, wherein the location response is sent in a predetermined format of complexity.

3. The method of claim 2 wherein the predetermined format of complexity comprises a response including one or more formats selected from the group consisting of: a street same, a cross street name, a direction of travel, an address, an intersection, a point of interest, and a feature.

4. A computer usable medium comprising computer readable code for communicating a vehicle location information, comprising:

computer readable code for initiating communication between a mobile communication unit and a receiving center;

computer readable code for requesting a location information, wherein the request is initiated by an automated speech recognition unit;

computer readable code for receiving the request for vehicle information at the receiving center;

computer readable code for receiving a vehicle location signal at the receiving center from the mobile vehicle;

computer readable code for receiving geographic information from a database based on the vehicle location signal; and computer readable code for sending the geographic information to the mobile vehicle and wherein computer readable code for initiating the request for location information comprises:

computer readable code for providing a set of pole-zero coefficients in response to a speech signal;

computer readable code for providing a set of cepstral coefficients in response to the pole-zero coefficients;

computer readable code for providing a spectral vector in response to the cepstral coefficients; and computer readable code for classifying the spectral vector and keyword.

* * * * *